(12) United States Patent
Imamura et al.

(10) Patent No.: US 7,774,450 B2
(45) Date of Patent: *Aug. 10, 2010

(54) METHOD FOR CREATING AND PROCESSING A SOAP MESSAGE, AND METHOD, APPARATUS AND PROGRAM FOR PROCESSING INFORMATION

(75) Inventors: Takeshi Imamura, Yokohama (JP); James Andrew Clark, Sunnyvale, CA (US); Hiroshi Maruyama, Tokyo (JP); Yumi Yamaguchi, Yamato (JP); Masayoshi Teraguchi, Yokohama (JP); Takayuki Itoh, Yokohama (JP); Fumiko Satoh, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 317 days.

This patent is subject to a terminal disclaimer.

(21) Appl. No.: 12/052,297

(22) Filed: Mar. 20, 2008

(65) Prior Publication Data
US 2008/0168166 A1    Jul. 10, 2008

Related U.S. Application Data

(63) Continuation of application No. 10/794,638, filed on Mar. 5, 2004, now Pat. No. 7,349,959.

(30) Foreign Application Priority Data
Mar. 7, 2003    (JP) .............................. 2003-061842

(51) Int. Cl.
*G06F 15/173* (2006.01)

(52) U.S. Cl. ...................... 709/223; 713/153; 713/160; 713/170; 713/175; 726/4; 380/259; 380/281

(58) Field of Classification Search ................. 709/223; 380/255, 259; 713/153, 160, 170, 175; 726/4
See application file for complete search history.

(56) References Cited

U.S. PATENT DOCUMENTS

| 7,055,143 | B2 * | 5/2006 | Ringseth et al. ............. 717/143 |
|---|---|---|---|
| 7,349,959 | B2 * | 3/2008 | Imamura et al. ............ 709/223 |
| 2003/0074579 | A1 * | 4/2003 | Della-Libera et al. ....... 713/200 |
| 2003/0081791 | A1 * | 5/2003 | Erickson et al. ............. 380/282 |
| 2003/0084292 | A1 * | 5/2003 | Pierce et al. ................. 713/168 |
| 2003/0084350 | A1 * | 5/2003 | Eibach et al. ................ 713/201 |
| 2003/0101284 | A1 * | 5/2003 | Cabrera et al. .............. 709/313 |
| 2003/0110373 | A1 * | 6/2003 | Champion ................... 713/153 |
| 2003/0172372 | A1 * | 9/2003 | Crisan et al. ................. 717/170 |
| 2003/0220925 | A1 * | 11/2003 | Lior ............................ 707/10 |
| 2004/0111600 | A1 * | 6/2004 | Kaler et al. .................. 713/150 |
| 2005/0005116 | A1 * | 1/2005 | Kasi et al. ................... 713/170 |
| 2005/0144457 | A1 * | 6/2005 | Lee et al. ..................... 713/176 |

* cited by examiner

*Primary Examiner*—Oanh Duong

(57) ABSTRACT

The present invention creates a SOAP message without using DOM by generating a body part by sequentially performing such a process of a message as encryption or signing for each piece of the message, generating a header part by using information acquired during the process, and by combining the body part and the header part. The present invention also breaks a SOAP message without using DOM by acquiring header information with parsing a received SOAP message and sequentially performing decode or verification of a signature of a body part according to the header information.

8 Claims, 17 Drawing Sheets

METHOD FOR CREATING AND PROCESSING A SOAP MESSAGE, AND METHOD, APPARATUS AND PROGRAM FOR PROCESSING INFORMATION

CROSS-REFERENCE TO RELATED APPLICATIONS

This is a Continuation application of U.S. application Ser. No. 10/794,638 filed on Mar. 5, 2004 now U.S. Pat. No. 7,349,959, which claims priority to Japanese Application No. 2003-061842 filed Mar. 7, 2003, the disclosures of which are herein incorporated by reference in their entirety.

BACKGROUND OF THE INVENTION

1. Field of the Invention

The present invention relates to processing of a data file, and, more specifically, to processing of an XML document such as a SOAP message used in Web Services.

2. Description of the Related Art

As a computer network such as Internet has prevailed, various services have been provided via a network. Recently, Web Services have been increasingly popular as a new framework for communication between computers. Web Services refer to a system for services to dynamically exchange data, without a human operation, according to various protocols such as HTTP (HyperText Transfer Protocol), which serves as a foundation of WWW (World Wide Web). Information is exchanged between services by using a SOAP (Simple Object Access Protocol) message. Prevailing of Web Services enables a client to automatically acquire various pieces of information.

It is important to provide security to prevent tampering of a message or impersonation in implementing a Web service. Recently, a specification of Web Services Security for applying a security technique such as encryption or a signature on a SOAP message has been proposed (for example, see Non-Patent Document 1).

There are a wide variety of terminal devices connecting to a network, ranging from a computer with a high processing capability such as a personal computer or a workstation to a terminal device with limited storage of memory or a limited processing capability to put higher priority on portability and downsizing, such as a portable telephone or a PDA (Personal Digital Assistants).

Portable telephones of these days have an environment for viewing a Web page through HTTP-based communication or an environment where a program of Java® (trademark of U.S. Sun Microsystems) or C is activated to execute an application for a game or the like. With these environments, a Web service that uses a portable telephone as a client can be implemented. For implementing the services, it is desirable to provide a portable telephone with functionality of composing and sending a SOAP message with Web Services Security by passing a function or an argument from an application and functionality of receiving and breaking a SOAP message with Web Services Security and passing the return value to the application. If a processing speed or runtime memory consumption is limited such as in a portable telephone, the functionality has to be implemented with processing as little as possible.

The main technique in Web Services is respective processes of composing a SOAP message before sending it and deciphering a SOAP message after receiving it.

These processes for a SOAP message are generally performed by creating DOM (Document Object Model) on memory. In this manner, processes can be performed through a tree structure without considering the described order in a message. Thus, this can be generally taken as a general processing manner. However, they have problems in creating and operating DOM, in that 1) they need too much memory consumption, and
2) too much time for processing.

In the case that a Web service is performed with portable telephones as clients, problems in the above-mentioned manner by using DOM becomes more serious, because a processing speed or runtime memory consumption is limited in a portable telephone.

One of solutions for the problems is to perform composing and breaking of a SOAP message in a streaming process. In order to provide the solution, for a document file including a header part and a body part, with a processing procedure and process information being) defined in the header part from which a processing object is referred to with ID, a technique is required that processing of a message in the body part according to a description in the header part is performed in a streaming process.

SUMMARY OF THE INVENTION

The present invention provides a technique for sending/receiving a SOAP message with a little burden on a processing capability or memory of a client and to implement a Web service system appropriate for using a terminal device with such a limited capability as a client.

The present invention also provides a method for processing a body part, which is performed according to a definition described in a header part, in a streaming process for a document file including a header part and a body part.

The present invention is implemented as a following method for creating a SOAP message. The method for creating a SOAP message includes a first step of reading out a message body from predetermined storing means predetermined piece by piece, a second step of generating a body part of a message by sequentially performing a process on the read out pieces and holding the body part in a work area in predetermined storing means, and at the same time, acquiring information on the process, a third step of generating a header part of a message including the acquired information on the process and holding the header part in a work area of predetermined storing means, and a forth step of composing a SOAP message by reading out the body part and the header part from the work area of the storing means and combining the parts.

Specifically, encryption and signing can be performed as the processes.

The present invention can also implemented as a following method for processing a SOAP message. The method for processing a SOAP message includes a first step of extracting information on a process of a body part from a header part of a SOAP message and storing the information into a work area of predetermined storing means, while parsing the SOAP message, and a second step of sequentially processing a predetermined part of the body part According to information stored in the work area of the storing means, while parsing the SOAP message.

Specifically, decode of an encrypted message or validation of a signed message can be performed as the processes.

In the case that parsing of a message has to be repeated recursively, the parsing can be performed by dynamically creating and applying an independent parser along the progress of processes.

Another aspect of the present invention can be implemented as an information processor configured as follows. The information processor is includes a processing unit for performing a predetermined process for a body part of a SOAP message, and at the same time, acquiring information on the process, a message composing control unit for reading a SOAP message predetermined piece by piece and passing the predetermined piece of the message to a processing unit on the basis of predetermined setting of message processing, a header-generating unit for generating a header part of a SOAP message including information on the process acquired by a processing unit, and a message-composing unit for composing a SOAP message by combining a body part processed by a processing unit and a header part generated by a header generating unit.

Another information processor according to the present invention is includes a breaking-control unit for detecting a header part and a body part by parsing a SOAP message and further detecting a processing object of the body part, a header-processing unit for extracting information on a process of a body part from a header part detected by the breaking-control unit, and a processing unit for performing a process on a processing object in a body part according to information extracted by the header-processing unit, wherein the breaking-control unit parses a SOAP message from the top in order, passes the detected header part to a header-processing unit, and passes a processing object in the detected body part to a processing unit, and wherein a header-processing unit and a processing unit sequentially process each part of a SOAP message received from a breaking-control unit.

The present invention can also be implemented as a program for performing a process corresponding to each step in the above-mentioned method for creating or processing a SOAP message by controlling a computer, or as a program for causing a computer to implement functionality of the above-mentioned information processor. The program can be provided by delivering a magnetic disk, an optical disk, semi-conductor memory or other record media that stores the program thereon, or by distributing over a network. The present invention can also apply a processing object to a data file conforming to a specification of description other than a SOAP message for including a header part and a body part with a processing object of a predetermined process being set in the body part and information on the process and information specifying the processing object being described in the header part.

DETAILED DESCRIPTION OF PREFERRED EMBODIMENTS

Figure 1:
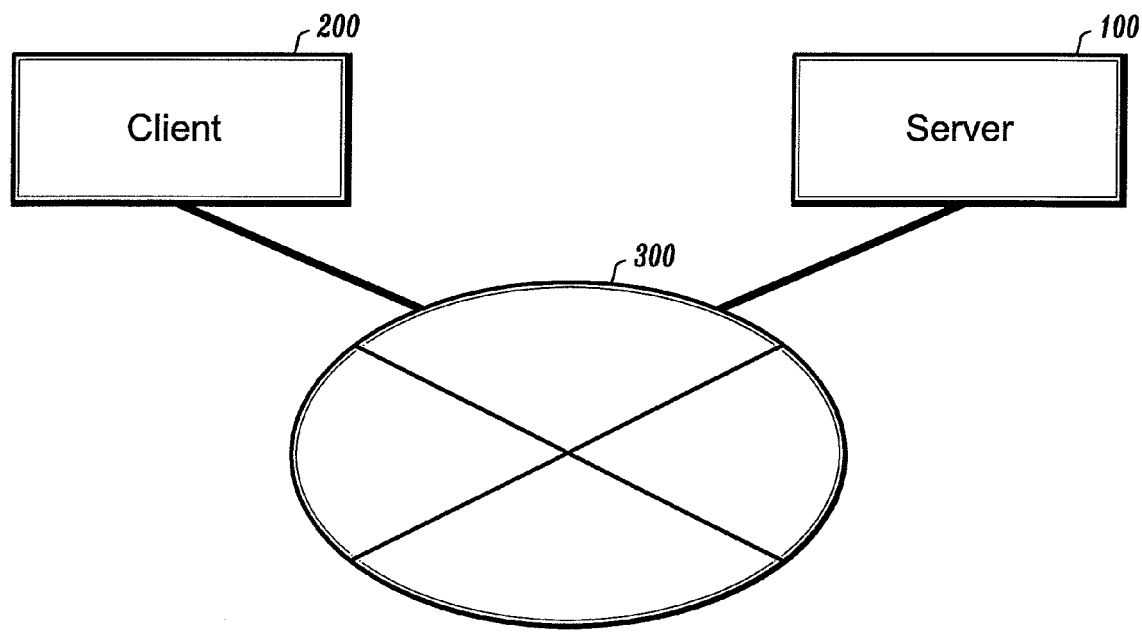
FIG. 1 is a diagram showing a configuration of a network system providing a Web service.

The present invention will be described in detail on the basis of the embodiments shown in the accompanying drawings. FIG. 1 is a diagram showing a configuration of a network system providing a Web service. As shown in FIG. 1, a network system providing a Web service is implemented by connecting server 100 for providing a service and client 200 for using the service over network 300 such as Internet. Communication between server 100 and client 200 is performed with an XML-based SOAP. Served 100 is implemented as a personal computer, a workstation or other computer. Client 200 is implemented as a computer such as a personal computer or a workstation, or an information terminal such as a portable telephone or a PDA with networking functionality. The embodiment will be described in the case that a portable telephone is used as client 200 as an example.

Figure 2:
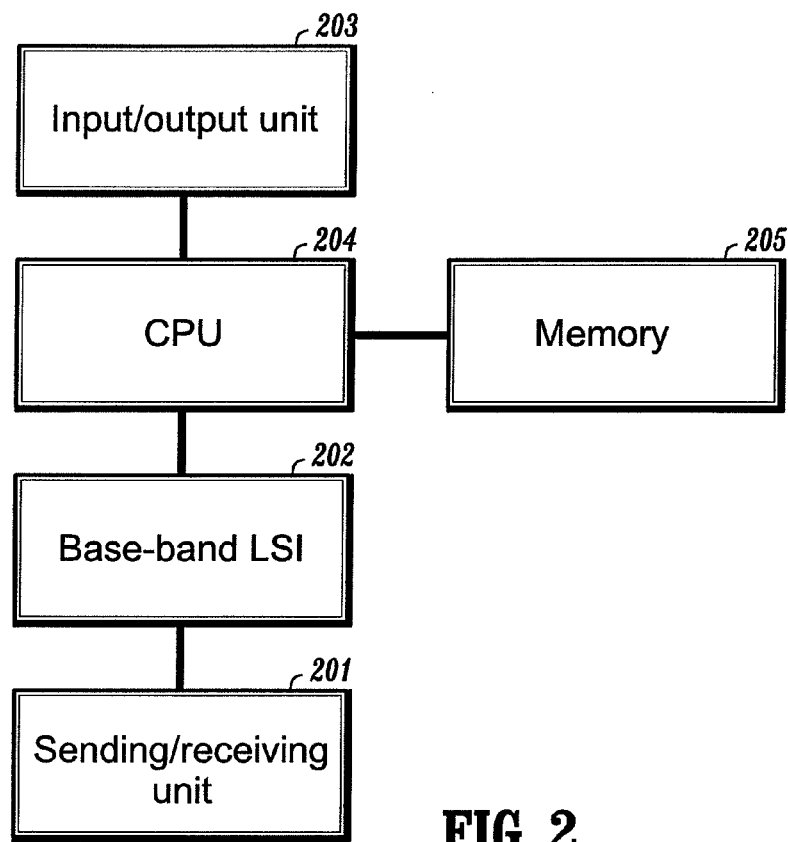
FIG. 2 is a diagram schematically showing a hardware configuration of a portable telephone used as a client according to the embodiment.

FIG. 2 is a diagram schematically showing a hardware configuration of a portable telephone used as client 200 in the embodiment.

As shown in FIG. 2, a portable telephone includes sending/receiving unit 201 for performing information communication by radio, base-band LSI 202 for performing signaling of digital data sent/received by radio, input/output unit 203 for displaying information, outputting an element of voice, inputting by key manipulation, or inputting an element of voice, CPU 204 for controlling various information processing and various functionality and memory 205.

A configuration shown in FIG. 2 is merely an example and other various configurations for a general information processor may be taken. In order to implement the embodiment, various information processors other than a portable telephone (a computer, PDA, etc.) may be used as client 200.

In Web service communication, data is exchanged as a SOAP message. Thus, main processes in client 200 are a composing process of a SOAP message before sending it and a breaking process of a SOAP message after receiving it. In the embodiment, encryption and signing of a message for providing Web Services Security are performed in composing a SOAP message. In turn, decode of a message and verification of a signature are performed in breaking the received message. Client 200 according to the embodiment performs the processes in a streaming process.

Figure 3:
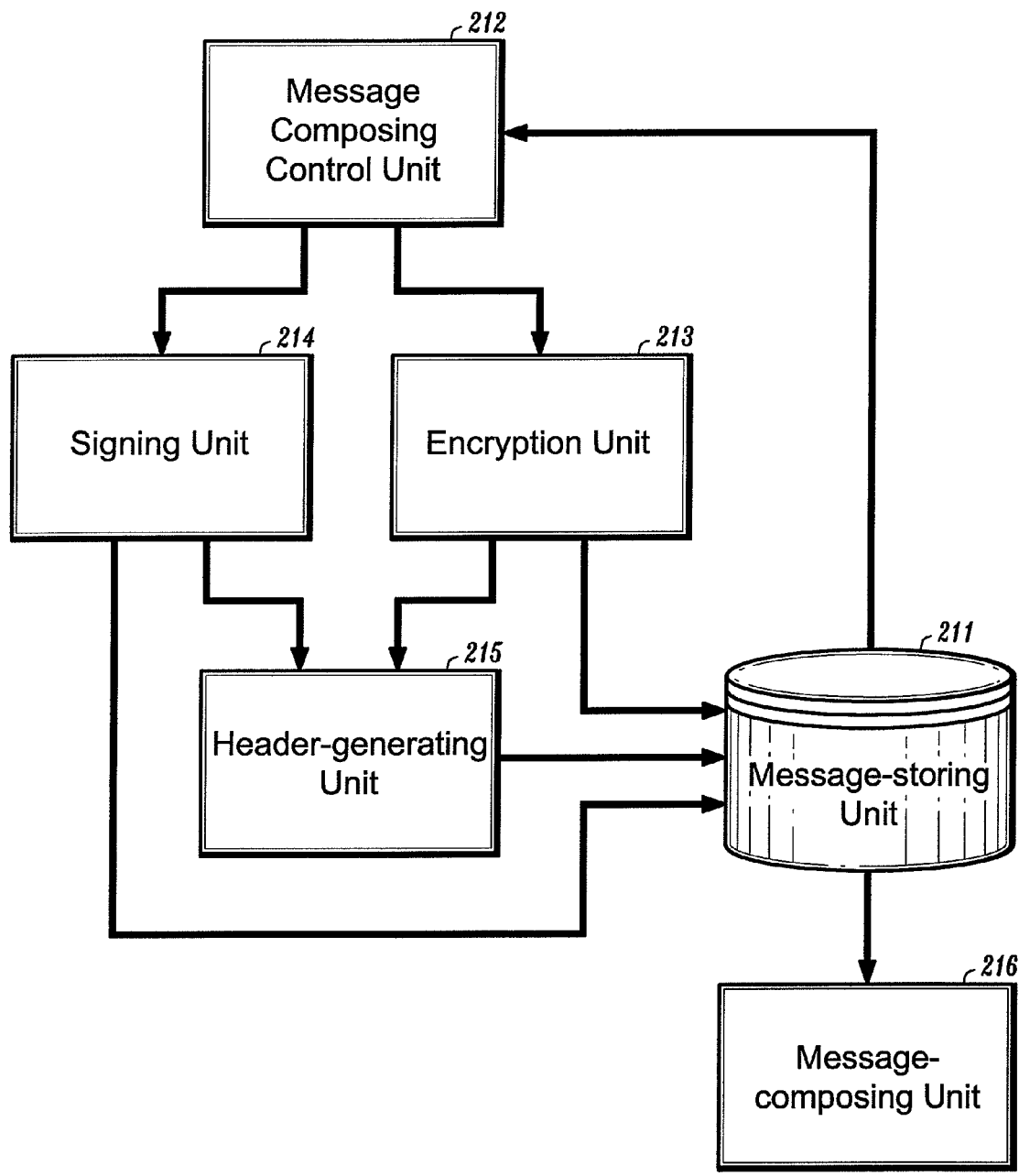
FIG. 3 is a diagram showing a functional configuration for composing a SOAP message in a client according to the embodiment.

FIG. 3 is a diagram showing a functional configuration for composing a SOAP message in client 200 according to the embodiment. Referring to FIG. 3, SAOP message composing means according to the embodiment includes message-storing unit 211 for storing a composed SOAP message, message composing control unit 212 for composing various pieces of information that will make a premise for composing a SOAP message, encryption unit 213 for encrypting a message, signing unit 214 for signing a message, header-generating unit 215 for generating a header for a SOAP message, message-composing unit 216 for composing a SOAP message by combining a message body processed in encryption unit 213 and signing unit 214 as needed and a header generated in header-generating unit 215.

In the above configuration, message-storing unit 211 is provided in memory 205 shown in FIG. 2, for example. Message composing control unit 212, encryption unit 213, signing unit 214, header-generating unit 215, and message-composing unit 216 are provided in CPU 204 shown in FIG. 2, for example.

In a sending process from client 200 to server 100, a request SOAP message is created with a function name and an argument name specified by a client application for using a service and an argument value. In the embodiment, the creating side of a SOAP message (i.e., client 200) can determine a range for signing objects and encryption objects, a processing order of signing and encryption, information on a key or a certificate, information on an algorithm to be used (hereinafter these pieces of information will be collectively referred to as "process information"). It is assumed that they are specified by a client application.

Message composing control unit 212 first composes a structure of a message in a stage prior to signing and encrypting processes. In this process, a group of tags forming a pattern of a SOAP message is previously (for example, on activating a program) stored in a work area in memory 205. A group of tags representing a function name or an argument name given by a client application is stored in a work area in memory 205 at least prior to communication with server 100. The groups of tags are arranged in the order as they are described in a SOAP message.

Message composing control unit 212 composes data recording process information such as information on a security token (such as a certificate), information on a signature (such as a signing method), and encryption information (such as a key, a way of encryption). Then message composing control unit 212 stores the data into a work are of memory 205. On this occasion, pieces of information on a signature and pieces of encryption information are arranged in the order specified by a client application.

Message composing control unit 212 also generates a SOAP message by converting a group of tags stored in memory 205 into a byte sequence of UTF-8 (UCS Transfer Format-8) according to a predetermined order. The generated SOAP message is stored into message-storing unit 211. If a predetermined part of the SOAP message corresponds to an encryption object or a signature object, a byte sequence of the corresponding part is passed to encryption unit 213 or signing unit 214 according to an order specified in the above-mentioned process information and stored into message-storing unit 211 after the process. Processing of a byte sequence such as encryption or signing can be performed separately for a predetermined number at a predetermined location in a SOAP message. Passing of a byte sequence from message composing control unit 212 to encryption unit 213 or signing unit 214 is performed for each piece as line by line or byte by byte. Encryption or signing to be mentioned below is sequentially performed in a streaming process for the each piece.

On receiving a byte sequence of a processing object from message composing control unit 212, encryption unit 213 first creates and outputs a message piece (a byte sequence) describing a reference ID for referring to a corresponding part of a processing object in the message and an encrypting method. Then encryption unit 213 encrypts and outputs the received byte sequence.

When an encryption algorithm, which can be processed in a streaming process, is used as an encryption method, encryption is sequentially performed on a byte sequence received from message composing control unit 212 and the result is output. On the other hand, when an encryption algorithm, which can be processed in a streaming process, is not used, byte sequences received from message composing control unit 212 are accumulated and collectively encrypted when the bottom of a part to be encrypted is reached, and the result is output. A plurality of encryption units 213 can be provided in accordance with the type of encryption performed on a byte sequence.

On receiving a byte sequence of a processing object from message composing control unit 212, signing unit 214 first creates and outputs a message piece (a byte sequence) describing a reference ID for referring to a corresponding part of a processing object in the message. Then signing unit 214 accumulates byte sequences received from) message composing control unit 212, and when the bottom of a part to be signed is reached, calculates a digest value for the accumulated byte sequences (a value calculated in a specific method from an original byte sequence) and records the value into a work area of memory 205. Accumulated byte sequences are output as they are. A plurality of signing units 214 can be provided in accordance with the type of signing performed on a byte sequence.

Output byte sequences processed in encryption unit 213 or signing unit 214 are stored in message-storing unit 211 with other pieces of a SOAP message generated in message composing control unit 212 as a part of a request SOAP message. When a byte sequence is an object of a plurality of processes (for example, when it is encrypted and then signed, or when it is subject to various types of encryption or signatures), an output byte sequence from a process becomes an input byte sequence to a following process (for example, a byte sequence is encrypted by encryption unit 213, and then the output byte sequence will be subject to a signing process as an input byte sequence to signing unit 214). After every process finishes, the byte sequence is stored into message-storing unit 211.

Figure 4:
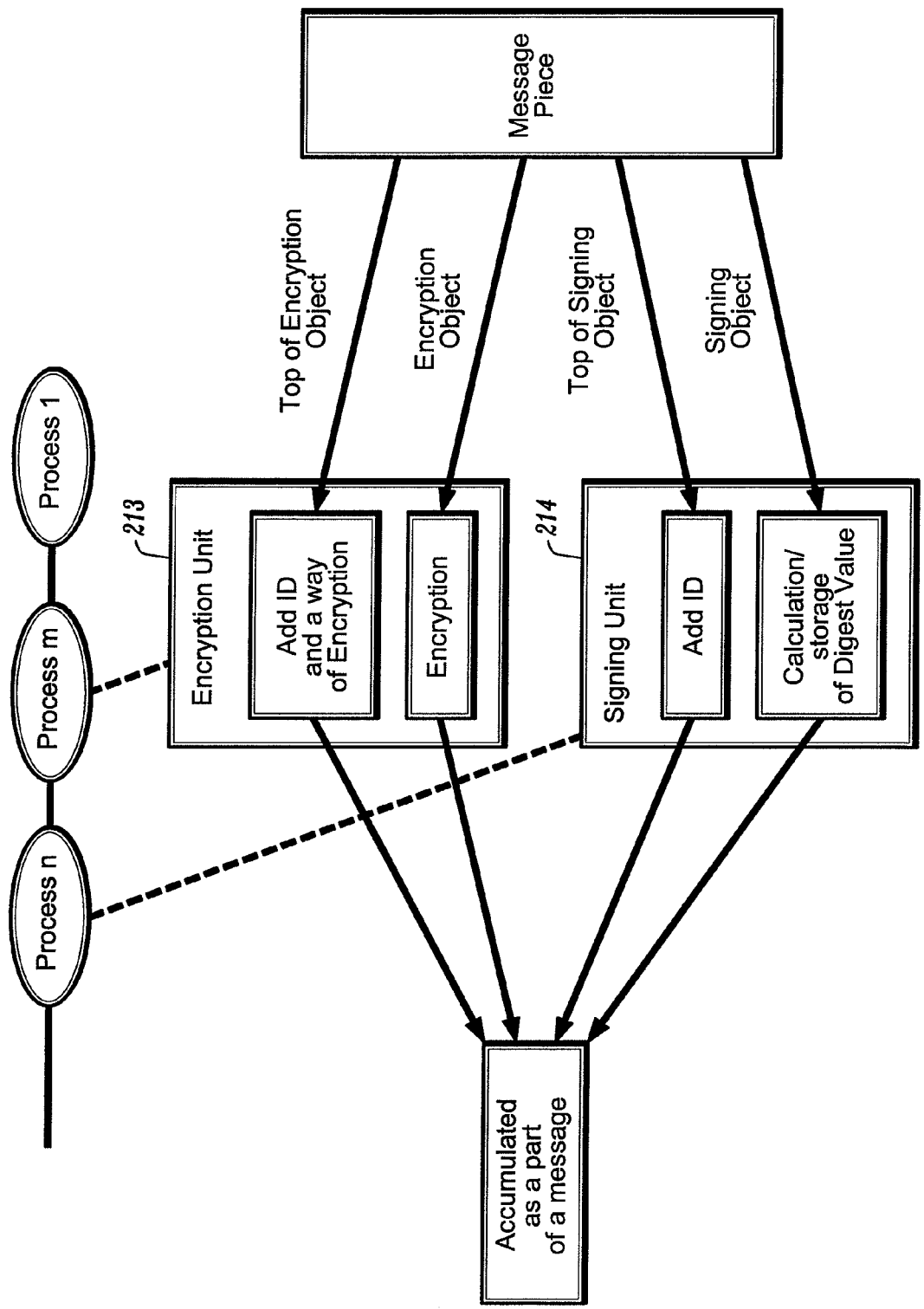
FIG. 4 is a diagram showing an image of a process according to the embodiment in a streaming process for each message piece.

FIG. 4 is a diagram showing an image of the above-mentioned process performed in a streaming process for each message piece. As shown in FIG. 4, a SOAP message generated in message composing control unit 212 is sent to encryption unit 213 or signing unit 214 piece by piece, sequentially processed in a streaming process, and accumulated in message-storing unit 211 as a byte sequence forming a request SOAP message, according to data in process information composed at message composing control unit 212. Which piece of a SOAP message is subject to which process is determined according to data composed on the basis of initialization in message composing control unit 212. In the example shown in FIG. 4, an encryption process is performed on process "m", and a signing process is performed on the next process "n".

After processes by encryption unit 213 and signing unit 214 are completed for all of signing objects and encryption objects in a SOAP message generated in message composing control unit 212, header-generating unit 215 generates information to be described in a header of this SOAP message as a byte sequence. Specifically, a header is generated in the following manner.

Figure 5:
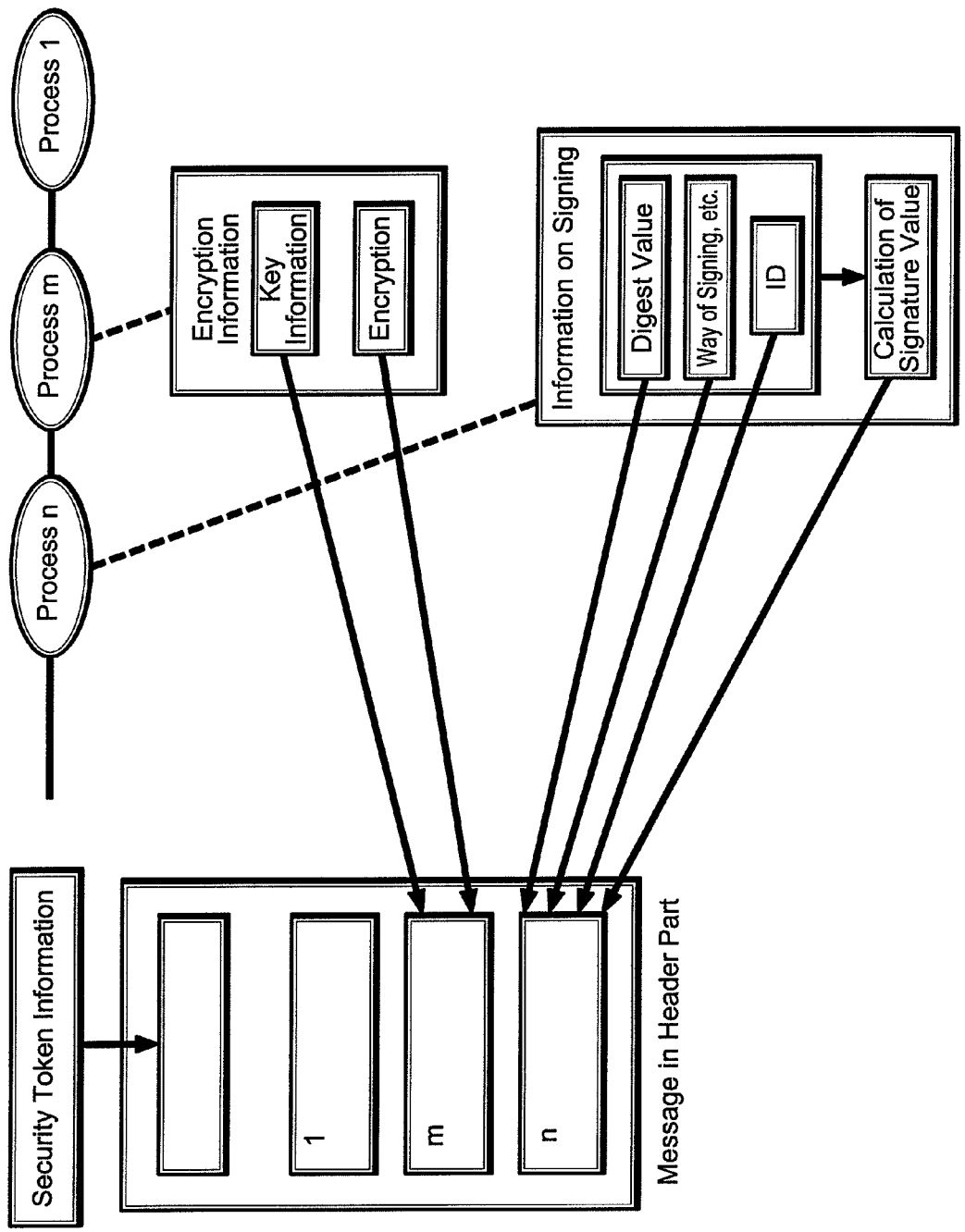
FIG. 5 is a diagram illustrating a process by a header-generating unit according to the embodiment.

FIG. 5 is a diagram illustrating a process by header-generating unit 215.

As shown in FIG. 5, header-generating unit 215 first reads out information on security token, which was composed in message composing control unit 212 and have been held in a work area of memory 205, and outputs the information as a byte sequence. Then header-generating unit 215 inputs encryption information acquired by encryption unit 213 (such as a reference ID or an encryption key) and information on signing acquired by signing unit 214 (such as a digest value, a signing method, or a reference ID), and outputs the information as a byte sequence in accordance with an order of processes shown in process information. For signing, header-generating unit 215 outputs previously recorded a digest value along with a signature value calculated from information including the digest value. These output byte sequences are stored in message-storing unit 211 as header information to a SOAP message.

As mentioned above, a necessary part of a SOAP message generated by message composing control unit 212 is subject to a process by encryption unit 213 and signing unit 214. After header-generating unit 215 generates information, message-composing unit 216 reads out the pieces of data from message-storing unit 211, and combines the pieces of data to compose a request SOAP message. The composed request SOAP message is sent to server 100 via base-band LSI 202 and sending/receiving unit 201 shown in FIG. 2.

As mentioned above, according to the embodiment, a process of data performed in composing a SOAP message such as encryption or signing is performed in a streaming process. After the process finishes, header information is generated by using information acquired during the process. Composing a SOAP message in such a procedure requires that only information acquired by each process and a message piece in processing has to be held in memory in a stage of performing a process, and only acquired information accumulated has to be held in memory in a stage of generating header information. In other words, a whole of a SOAP message or an intermediate representation such as DOM needs not to be read in a work area of memory for performing a process as in a conventional art; thereby a runtime memory usage can be significantly reduced. In the embodiment, an intermediate representation such as DOM is not created; thereby time needed to compose a SOAP message can be reduced.

Figure 6:
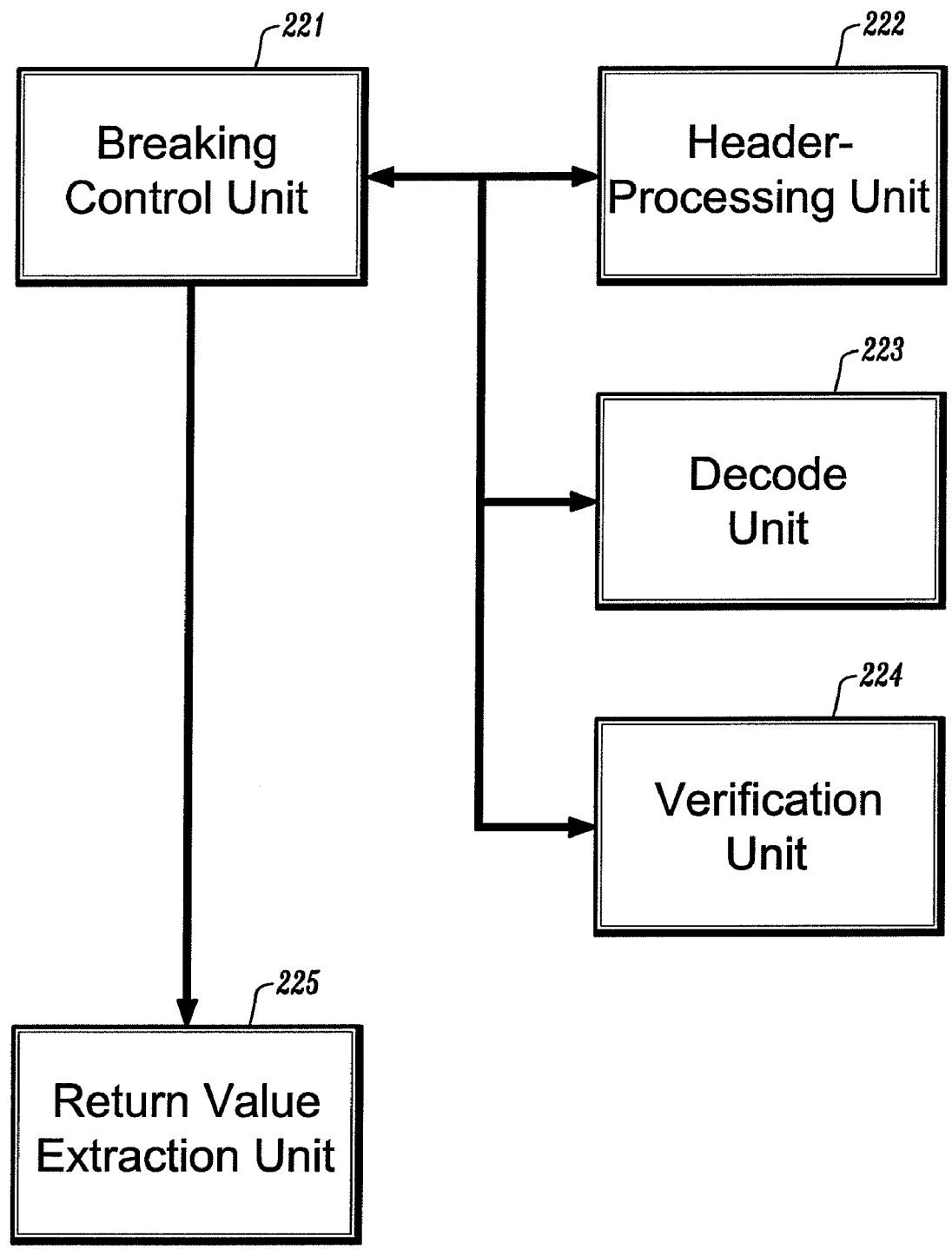
FIG. 6 is a diagram showing a functional configuration for breaking a SOAP message in a client according to the embodiment.

FIG. 6 is a diagram showing a functional configuration for breaking a SOAP message in client 200 according to the embodiment. Referring to FIG. 6, SOAP message breaking means according to the embodiment includes breaking control unit 221 to control for breaking a received SOAP message in a streaming process, header-processing unit 222 for fetching necessary information from a header part of a SOAP message, decode unit 223 for decoding an encrypted part (a byte sequence), verification unit 224 for verifying a signature, and return-value extraction unit 225 for extracting a broken SOAP message return value.

Each function described above is provided in CPU 204 shown in FIG. 2, for example.

In receiving a response SOAP message sent from server 100 to client 200, a return value is acquired from a SOAP message signed and encrypted in server 100 by performing each process of verifying a signature and decoding an encrypted message. Then the acquired return value is passed to a client application. Under Web Services Security, a number of security processes may have been performed, for example when a predetermined object (a byte sequence) is signed and anther object (a byte sequence) is encrypted. In the embodiment, a header part of a SOAP message is broken by parsing from the top of the message in a streaming process.

Breaking control unit 221 parses a received response SOAP message by using an XML parser. When a header part, a part of a decode object (an encrypted part), and a part of a verification object (a signed part) are detected, byte sequences of the parts are passed to header-processing unit 222, decode unit 223, and verification unit 224, respectively, piece by piece such as line by line or byte by byte for performing respective processes.

Header-processing unit 222 receives a header part of a response SOAP message from breaking control unit 221 sequentially from the top, processes the header part in a streaming process, and acquires information necessary to the following breaking process.

Figure 7:
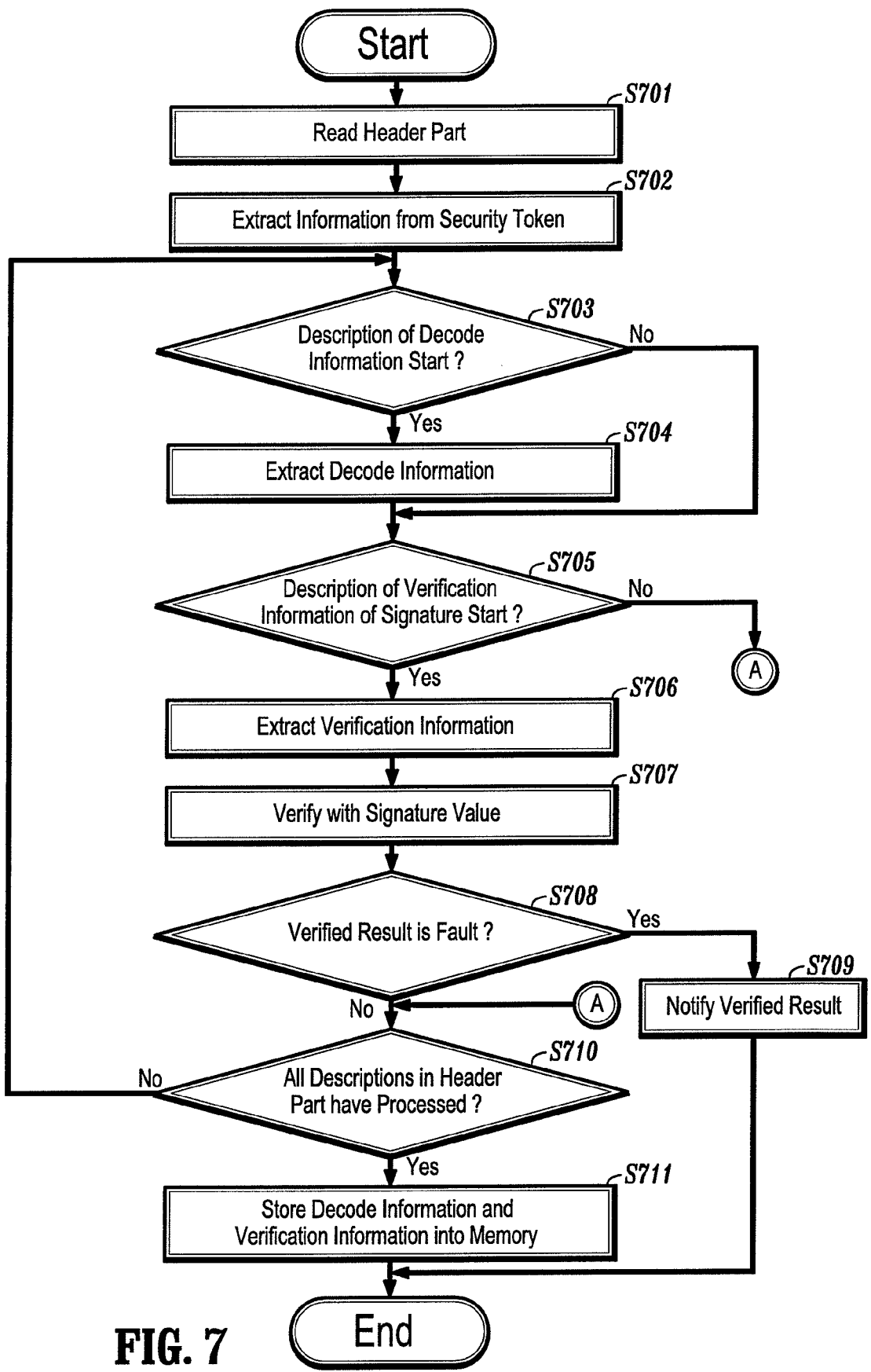
FIG. 7 is a flowchart illustrating operations of header-processing unit according to the embodiment.

FIG. 7 is a flowchart illustrating operations of header-processing unit 222.

Referring to FIG. 7, header-processing unit 222 reads a header part of an acquired response SOAP message (step 701), and when a description of a security token starts, extracts information on a certificate or ID described therein and records the information or the ID into a work area of memory 205 (step 702). Next, when a description of decode information starts, header-processing unit 222 extracts decode information (decode key, ID of a decode object, etc.) and records the decode information into a work area of memory 205 (steps 703, 704). When a decode key is encrypted, the key is decoded and recorded. When a description of verification information of a signature starts, header-processing unit 222 extracts verification information (a digest value, a verification object ID, a digesting method, a signature value, etc.) and records the verification information into a work area of memory 205 (steps 705, 706). Header-processing unit 222 further verifies signature contents by comparing a signature value calculated from a byte sequence of UTF-8 in signature information with a signature value extracted at step 705 (step 707). When a verified result is FAULT, header-processing unit 222 suspends the process and notifies breaking control unit 221 that the verified result is FAULT (steps 708, 709). On receiving the notification, breaking control unit 221 terminates the breaking process of the response SOAP message and performs predetermined error processing such as notification to a client user.

After the above-mentioned processes are performed on the entire header part of the response SOAP message, header-processing unit 222 stores decode information and verification information arranged in the order that decode and verification are described in a header part into memory 205 (steps 710, 711). Decode and verification to be described below are performed in this order.

Breaking control unit 221 keeps on reading the response SOAP message with reference to decode information and verification information stored in memory 205. When a decode object or a verification object, which is specified in header information acquired by header-processing unit 222, is detected, breaking control unit 221 passes the object to decode unit 223 or verification unit 224, and has the process performed. As mentioned above, a number of security processes may have been performed on a plurality of parts in a SOAP message. Therefore, breaking control unit 221 controls the processes in the following manner.

Figure 8:
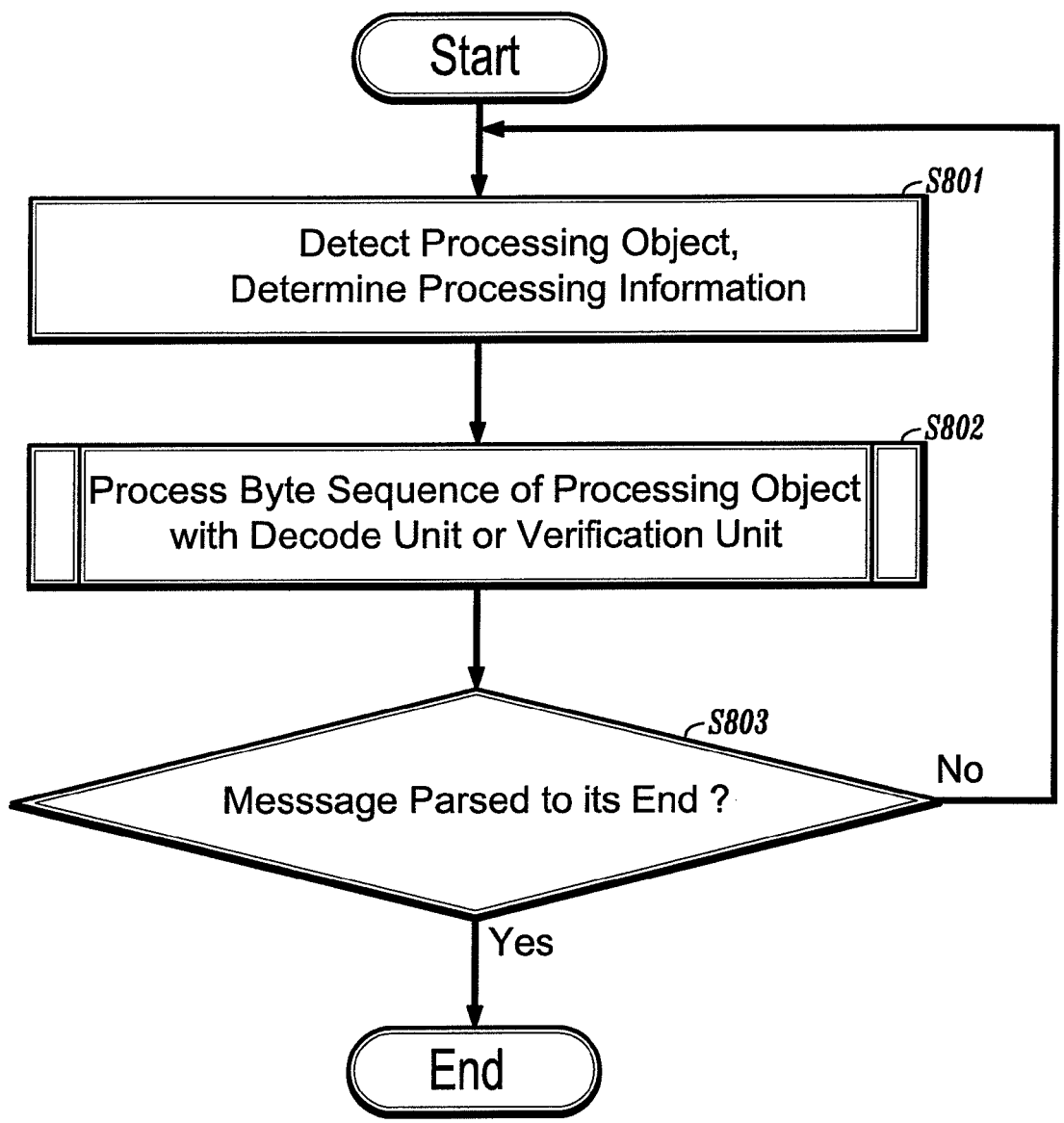
FIG. 8 is a flowchart illustrating a controlling procedure by breaking control unit according to the embodiment.

FIG. 8 is a flowchart illustrating a controlling procedure by breaking control unit 221. When breaking control unit 221 detects a start of a decode object or a verification object (hereinafter referred to as "processing object") from a SOAP message, it determines the object corresponds to which of decode information or verification information (hereinafter referred to as "process information"), which was acquired by header-processing unit 222 (step 801). The determination is performed by sequentially evaluating and selecting the pieces of process information from the first piece in the order of the pieces acquired at step 711 shown in FIG. 7. If decode information is selected in the determination process, following process information is not evaluated. As a result, multiple pieces of process information may be selected. Next, decode unit 223 or verification unit 224 sequentially processes the byte sequences of a processing object according to the selected process information (step 802). A process performed by decode unit 223 or verification unit 224 will be described in detail. Finally, when the end of a process for a processing object is detected in notification from decode unit 223 or verification unit 224, the selected process information is released and parsing of the SOAP message continues. When the SOAP message is parsed to its end and a necessary process is completed, breaking of the SOAP message ends (step 803).

Next, a process shown in step 802 in FIG. 8 will be described in detail.

Decode unit 223 decodes a byte sequence of decode object detected in breaking process unit 221 on the basis of selected decode information in a streaming process according to the following procedure.

Figure 9:
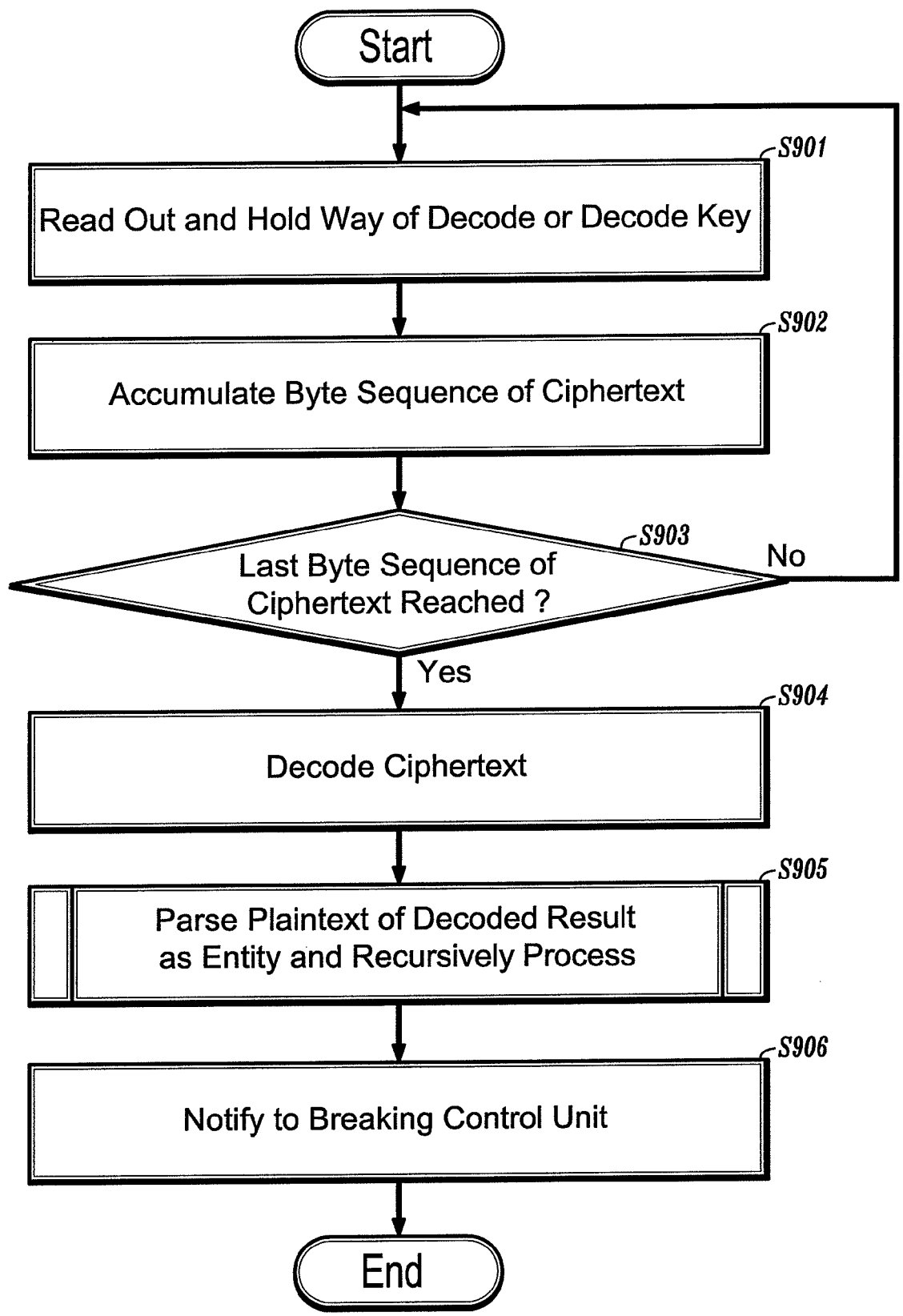
FIG. 9 is a flowchart illustrating a decode procedure by decode unit according to the embodiment.

FIG. 9 is a flowchart illustrating a decode procedure by decode unit 223.

As shown in FIG. 9, when a way of decode is described in a byte sequence received from breaking control unit 221, decode unit 223 holds the description in a work area in memory 205. When information on a decode key is described in a byte sequence received from breaking control unit 221, decode unit 223 acquires the decode key and holds the decode key in a work area in memory 205 (step 901). When a byte sequence received from breaking control unit 211 is a ciphertext to be decoded, decode unit 223 accumulates the ciphertext in a work area of memory 205 (step 902). When the last byte sequence of a ciphertext to be decoded is reached, the entire ciphertext is decoded by using decode information acquired at step 704 shown in FIG. 7 (steps 903, 904).

Next, decode unit 223 passes a plaintext, the decoded result, to breaking control unit 221, parses the entire plaintext as an entity, and recursively applies a procedure shown in FIG. 8 (step 905). When no decode object is detected after repeating a parsing process and decode, the process for the decode object ends. Then, decode unit 223 accumulates a plaintext, the decoded result, in memory 205 as a part of a response SOAP message (i.e., replaces the corresponding part of an original response SOAP message with the plaintext), and at the same time, notifies breaking control unit 221 of the end of the process, returns to the first operation by breaking control unit 221 (step 906) and keeps on parsing a SOAP message (step 803 in FIG. 8).

In processes shown in FIG. 9, ciphertexts to be decoded are accumulated and all the ciphertexts are decoded after the last byte sequence is reached. However, when a way of decode is such a way that can be performed in a streaming process (for example, "triple DES" or "AES"), decode can be performed in the following procedure instead of in that shown in FIG. 9.

Figure 10:
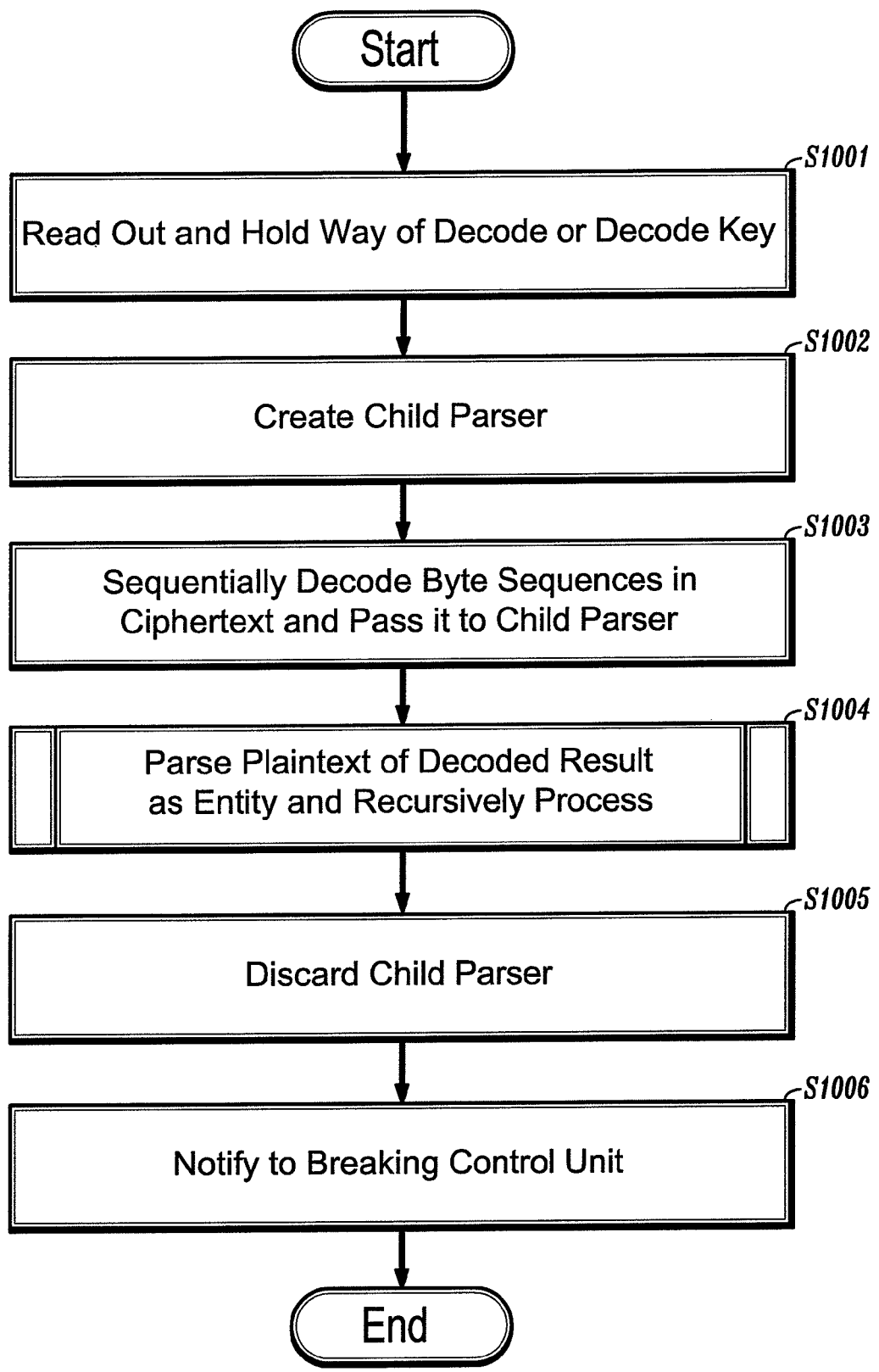
FIG. 10 is a flowchart illustrating another decode procedure by a decode unit according to the embodiment.

FIG. 10 is a flowchart illustrating another decode procedure by decode unit 223.

As shown in FIG. 10, when a way of decode is described in a byte sequence received from breaking control unit 221, decode unit 223 holds the way of decode in a work area in memory 205. When information on a decode key is described in a byte sequence received from breaking control unit 221, decode unit 223 acquires the decode key and holds the key in a work area of memory 205 (step 1001).

Next, on receiving the first byte sequence of a ciphertext to be decoded from breaking control unit 221, decode unit 223 creates an independent parser that keeps the same inner state as in the current parser by breaking control unit 221 (hereinafter referred to as "a child parser". The current parser will be called "a parent parser" against the child parser.) (step 1002). Then, decode unit 223 sequentially decodes the following byte sequences in the ciphertext (hereinafter referred to as "a partial ciphertext") and passes the decoded result to the child parser created at step 1002 (step 1003).

The child parser sequentially parses an acquired plaintext (a plaintext against a partial ciphertext) as a part of an entity and recursively applies the same procedure as shown in FIG. 8 (step 1004).

When the last byte sequence of a ciphertext is reached through the recursive process, decode unit 223 discards the child parser created at step 1002, as no part remains to be decoded in the byte sequence (step 1005). Then, decode unit 223 accumulates a plaintext, the result of the profess, in memory 205 as a part of a request SOAP message (i.e., replaces the corresponding part of an original response SOAP message with the plaintext), and at the same time, notifies breaking control unit 221 of the end of the process, returns to the first operation by breaking control unit 221 (step 1006) and keeps on parsing a SOAP message (step 803 in FIG. 8). A recursive process at step 1004 is repeated until no part to be decoded is detected after parsing of a plaintext decoded at step 1003 by a child parser. In other words, as far as a decode object is detected, a child parser to a child parser is dynamically created with a nested structure and each process is performed at each stage. When no decode object is detected, the operation returns to a process by a parent parser.

In the procedure shown in FIG. 10, an independent parser (a child parser) is prepared for a byte sequence, a decoded result, and parsing and decode are sequentially performed in a streaming process. That is why the entire ciphertext is not held in memory 205 during the processes as it is during the processes shown in FIG. 9. Accordingly, overhead is reduced; thereby performance of processes is expected to improve. As another overhead occurs for creating a child parser, the processes of the procedure shown in FIG. 10 are preferably performed when it is advantageous to have overhead for holding a ciphertext. One of ways to reduce overhead for creating a child parser is to reuse a child parser, which was created once, if possible. A process of creating a child parser will be described in detail below.

Verification unit 224 verifies a signature in a streaming process in the following procedure on the basis of selected verification information for a byte sequence to be verified that is detected in breaking control unit 221.

Figure 11:
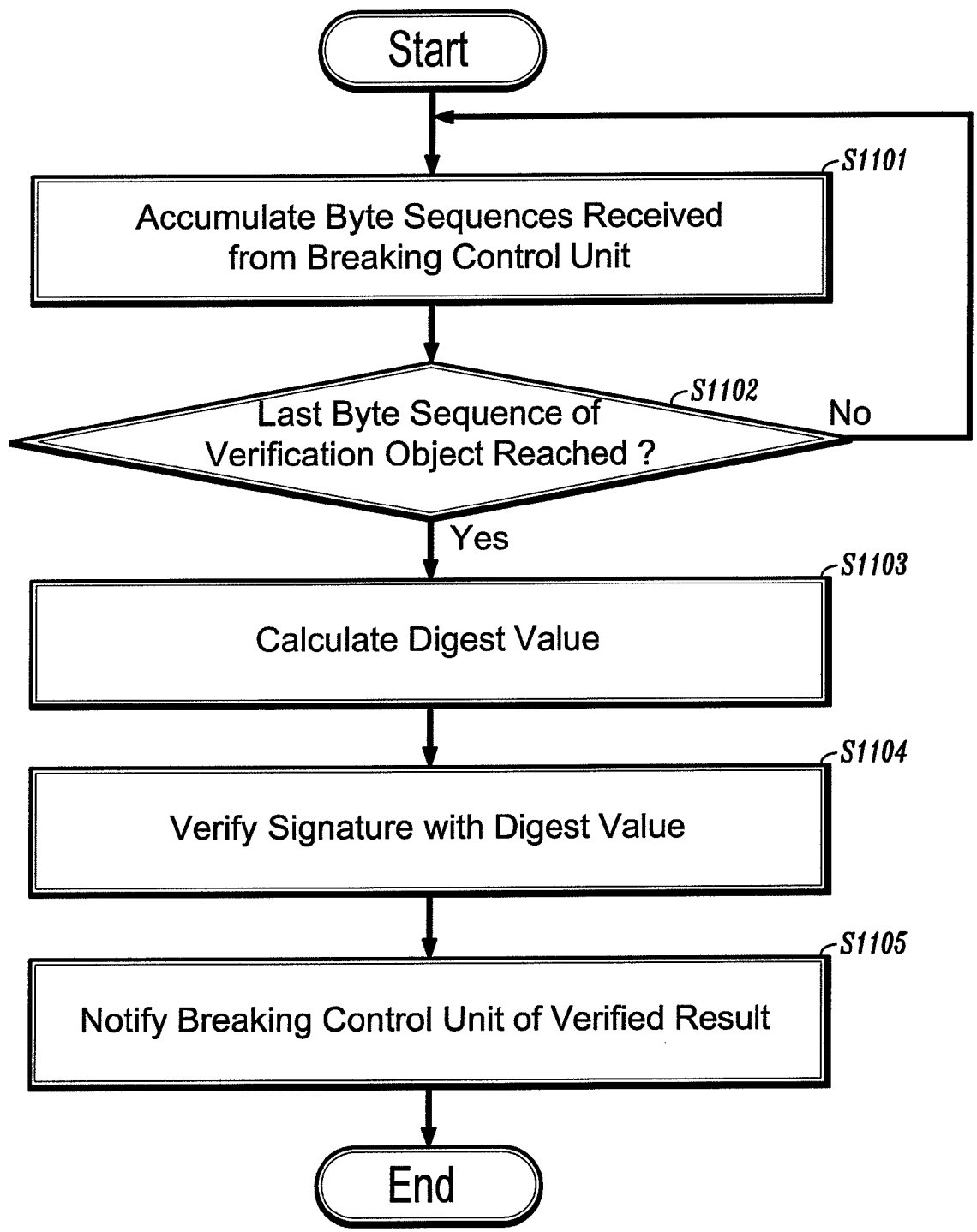
FIG. 11 is a flowchart illustrating a verification procedure by a verification unit according to the embodiment.

FIG. 11 is a flowchart illustrating a verification procedure by verification unit 224.

As shown in FIG. 11, verification unit 224 accumulates byte sequences received from breaking control unit 221 (step 1101). When the end of a verification object is reached, a digest value for the accumulated byte sequences is calculated (steps 1102, 1103). Then verification unit 224 verifies a signature content by comparing the calculated digest value with a digest value included in verification information acquired at step 706 in FIG. 7 (step 1104) and notifies breaking control unit 221 of the verified result (step 1105).

When the verified result is TRUE, parsing of the SOAP message continues in breaking control unit 221 (step 803 in FIG. 8). When the verified result is FALSE, breaking control unit 221 terminates the breaking process of a response SOAP message and performs a predetermined error process such as notification to a client user.

Figure 12:
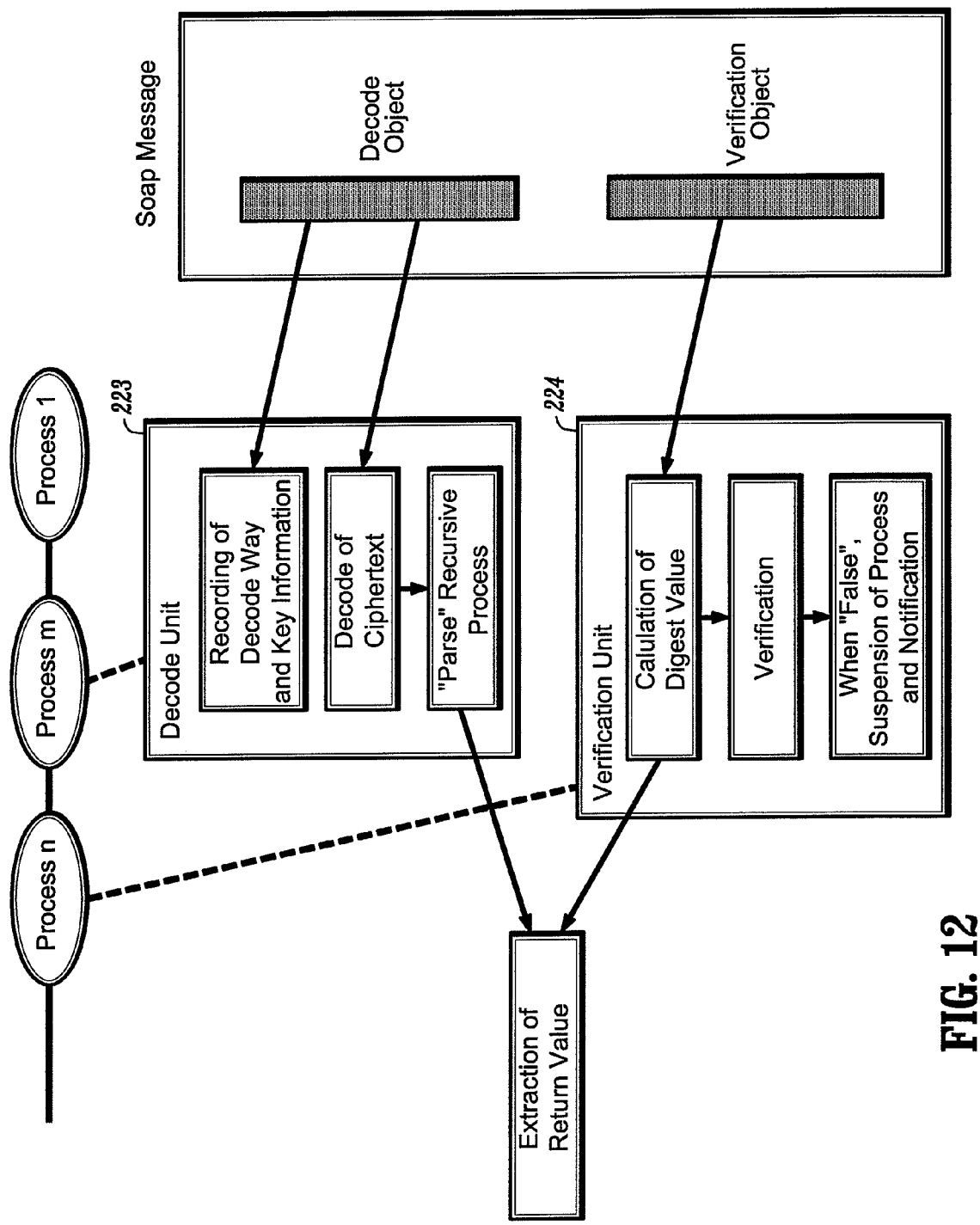
FIG. 12 is a diagram showing an image of decode or verification of a signature according to the embodiment performed on a response SOAP message.

FIG. 12 is a diagram showing an image of decode or verification of a signature performed on a response SOAP message. As shown in FIG. 12, a decode object in a message detected in breaking control unit 221 is sent to decode unit 223 and processed, while a verification object is sent to verification unit 224 and processed. In the example shown in FIG. 12, decode is performed on process "m" in a SOAP message, and verification is performed on process "n" in a SOAP message. If a number of security processes has been performed on a predetermined part in a message, the part has to be processed as a processing object of each security process. For example, when a predetermined byte sequence is encrypted and singed, the byte sequence has to be decoded and verified. In such a case, an output byte sequence from a previous process is an input byte sequence to the next process. A byte sequence through the processes is returned to a corresponding part of an original response SOAP message and subject to extraction of a return value described below.

When return value extraction unit 225 finds a tag of a return value, while reading a response SOAP message under a control of breaking control unit 221 as mentioned above, it stores the return value in a work area of memory 205. When all verified results are TRUE at the completion of verification performed by verification unit 224, return value extraction unit 225 passes the stored return value to a client application. The client application performs an intended process by using the return value.

Now, dynamic creation of an XML parser shown in FIG. 10 will be described in detail.

In the case of an XML Encryption, the base of Web Services Security, an XML document (a SOAP message) first has to be parsed, a part of which has to be decoded, and then the decoded result (hereinafter referred to as "an XML fragment") has to be further parsed for decoding the XML document in the manner illustrated in the above description about a function of decode unit 223. In the procedure shown in FIG. 9, in order to implement this multi-parsing process, an approach is taken for returning an XML fragment to a parser to be parsed as an entity.

Figure 13:
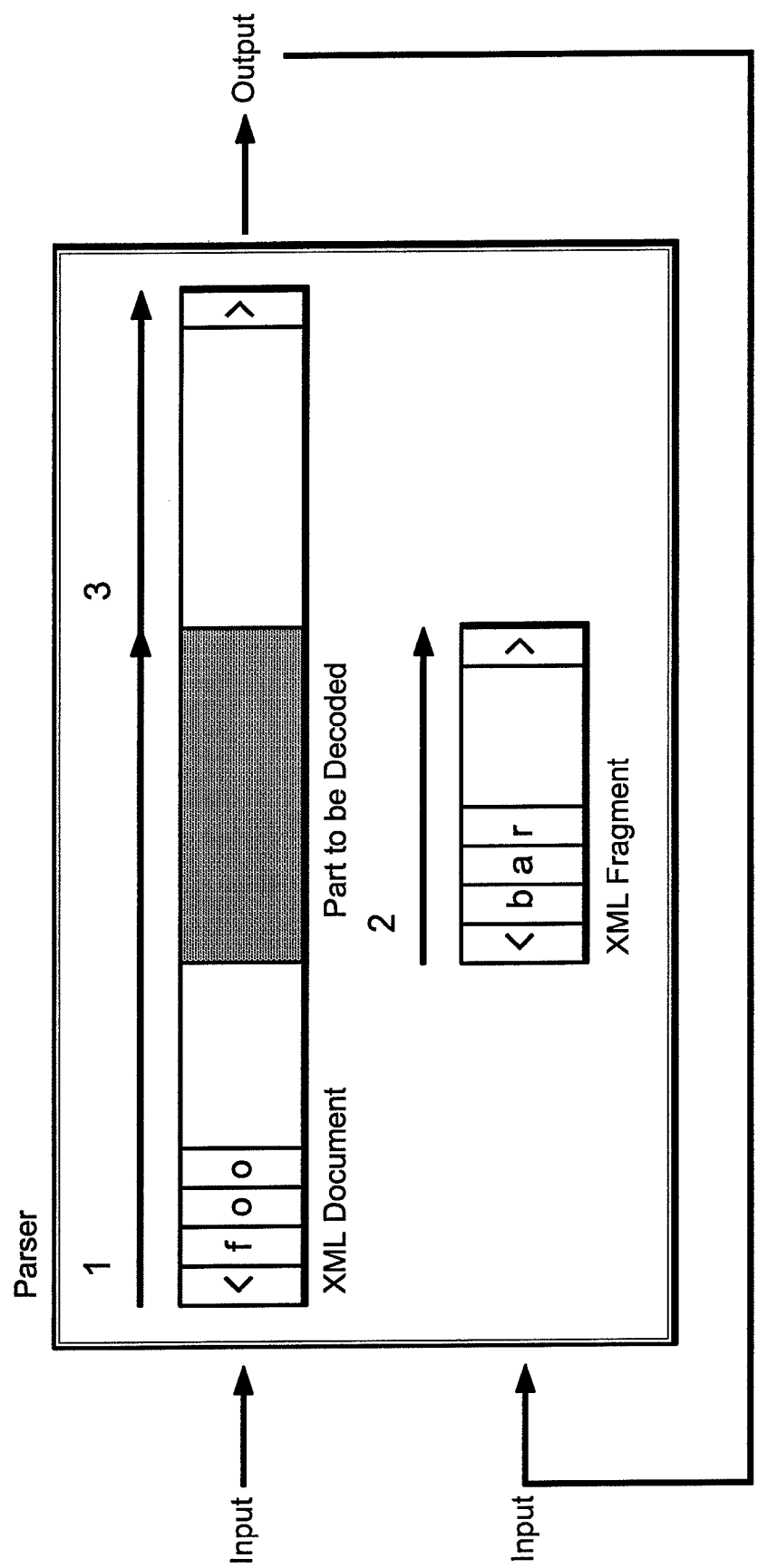
FIG. 13 is a diagram illustrating a parsing method of an XML document corresponding to the procedure shown in FIG. 9.

FIG. 13 is a diagram illustrating a parsing method of an XML document corresponding to the procedure shown in FIG. 9.

FIG. 13 shows recursive parsing performed by returning an XML fragment, a part of a parsed result of an XML document, to a parser. Recursive use of a parser provided to breaking control unit 221 in this manner enables multiple parsing processes to be performed on an XML document. Therefore, an XML fragment can be directly and appropriately parsed. However, a parser is used for parsing an XML fragment in this manner; thus, processing of an XML document has to wait until a parsed result of an XML fragment returns to the original XML document (when a part of an XML fragment is further parsed, processing of the XML fragment also waits until a parsed result for the part returns.). This caused problems in that:

1) memory is required for holding an original XML document or an XML fragment, while processing waiting, and 2) time is required, because a client application also has to wait until an original XML document is parsed.

Figure 14:
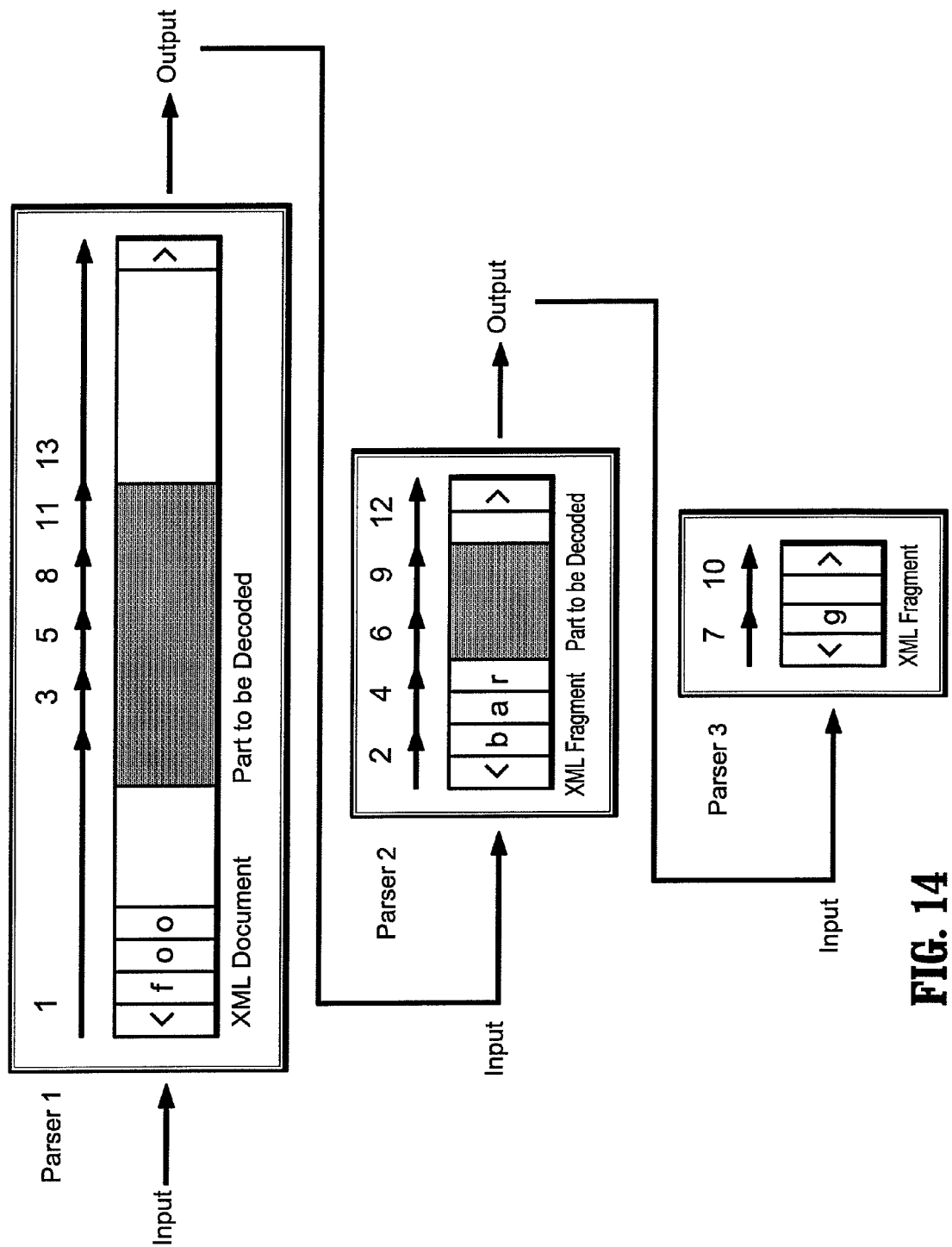
FIG. 14 is a diagram illustrating a parsing method of an XML document corresponding to the procedure shown in FIG. 10.

FIG. 14 is a diagram illustrating a parsing method of an XML document corresponding to the procedure shown in FIG. 10. In FIG. 14, parser 2 is a child parser to parser 1; parser 1 is a parent parser to parser 2. Similarly, parser 3 is a child parser to parser 2; parser 2 is a parent parser to parser 3.

As shown in FIG. 14, in the procedure shown in FIG. 10, a parser (a child parser), which holds the same inner state as in the current parser (a parent parser), is dynamically created, for parsing an XML fragment as an entity independently of parsing of an original XML document. When a part of an XML fragment is further decoded and the result is parsed, a process of creating a child parser and parsing independently is repeatedly performed. Each time an XML document (including an XML fragment) is decoded, the decoded part is independently parsed; thereby processing of an original XML document need not to wait until parsing of the part of the XML document finishes. In other words, a decode object may be replaced with a parsed result for the part, if needed, after the parsed result is acquired. A decode object is converted into a plaintext when it is decoded. Thus, the case that a decode object needs to be replaced with a parsed result is the case that a part of the decode object has been further decoded.

With this method, an original XML document or an XML fragment, which is a processing object of a parent parser, needs not to be held while a child parser is parsing; thereby memory usage can be reduced. As an entire breaking process of an XML document is performed in a streaming process and decode objects are sequentially decoded to be added to an XML document, a client applications can be sequentially performed without waiting until an original XML document is parsed.

A child parser has to inherit the inner state of a parent parser. Inner states that have to be inherited include at least a symbol table, a namespace stack, an entity table, an entity resolver, a document (or contents) handler, and an error handler. A symbol table is a table for managing a character string, securing that the same character string should have the same reference. A namespace stack is a stack for managing a namespace for each hierarchy. An entity table is a table for managing correspondence between an entity name and an entity. An entity resolver is a component for determining an entity from an entity name. A document (or contents) handler is a component for notifying a parsed result. An error handler is a component for notifying an error.

The inner states except for a namespace stack can be shared with a parent parser. A namespace stack is inherited to a child parser by copying, though the entire stack needs not to be copied. All that needed is to copy a namespace effective at the moment when decode starts.

When a child parser is dynamically created, exchanging of an XML fragment may be implemented in any manner. For example, the following implementation can be considered.

Figure 15:
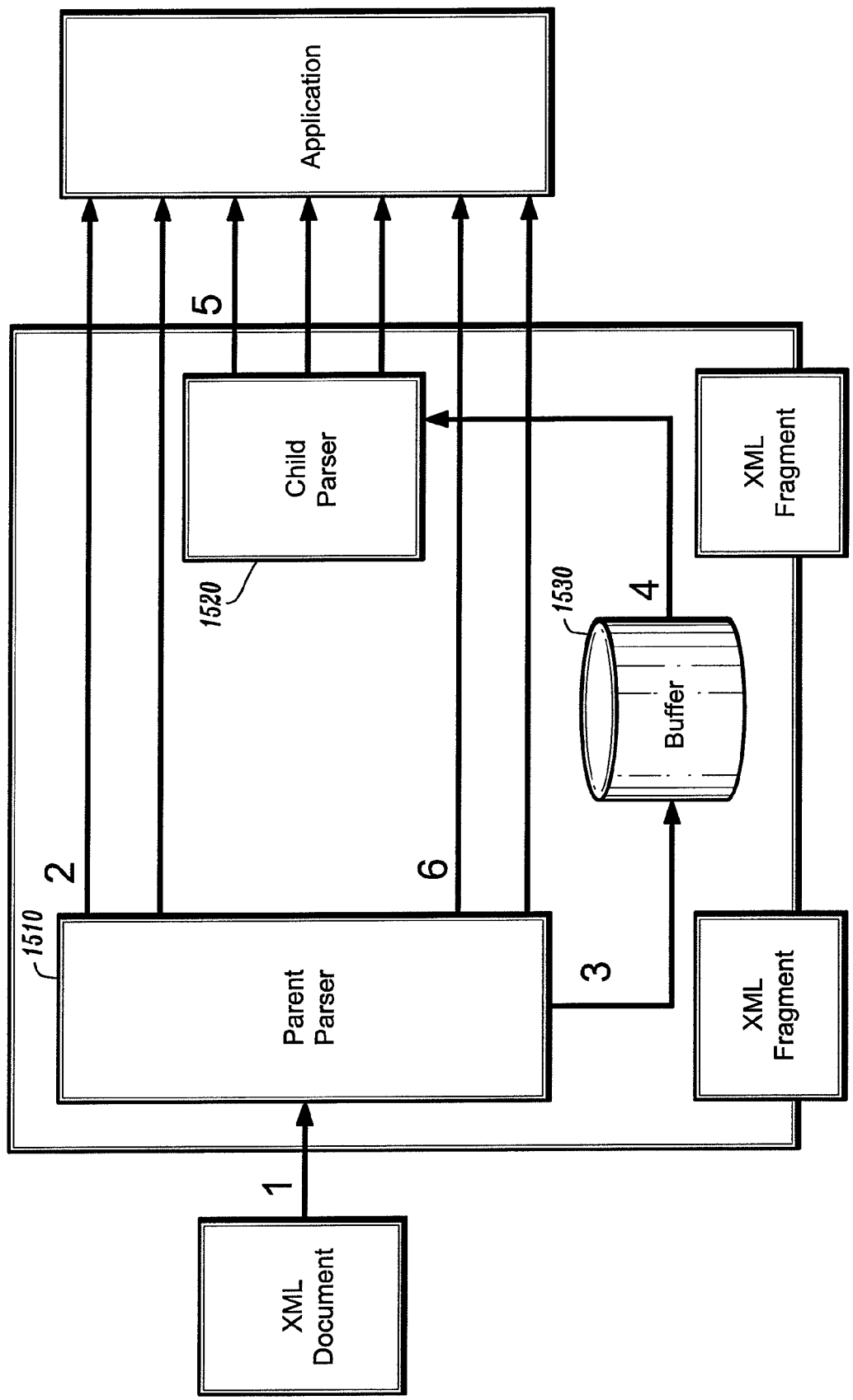
FIG. 15 is a diagram showing an implementation of exchanging of an XML fragment by a thread and a thread-safe buffer according to the embodiment.

FIG. 15 is a diagram showing an implementation of exchanging of an XML fragment by a thread and a thread-safe buffer.

In the implementation shown in FIG. 15, parent parser 1510 by breaking control unit 221, child parser 1520 created by decode unit 223, and buffer 1530 implemented by memory 205 are provided. At first, parent parser 1510 reads in an XML document (1), parses the XML document, and sends the parsed result to an application that uses the result (a client application in the above-mentioned client 200 of a Web service) (2). A part of a parsed XML document (an XML fragment) is written into a buffer 1530 (3). At this moment, in the above-mentioned client 200, an XML fragment is decoded in decode unit 223 and then written into buffer 1530.

Next, child parser 1520 reads in an XML fragment from buffer 1530 (4), parses the XML fragment and sends the parsed result to an application (5). Then parent parser 1510 parses the rest of the XML document and sends the parsed result to the application (6).

Figure 16:
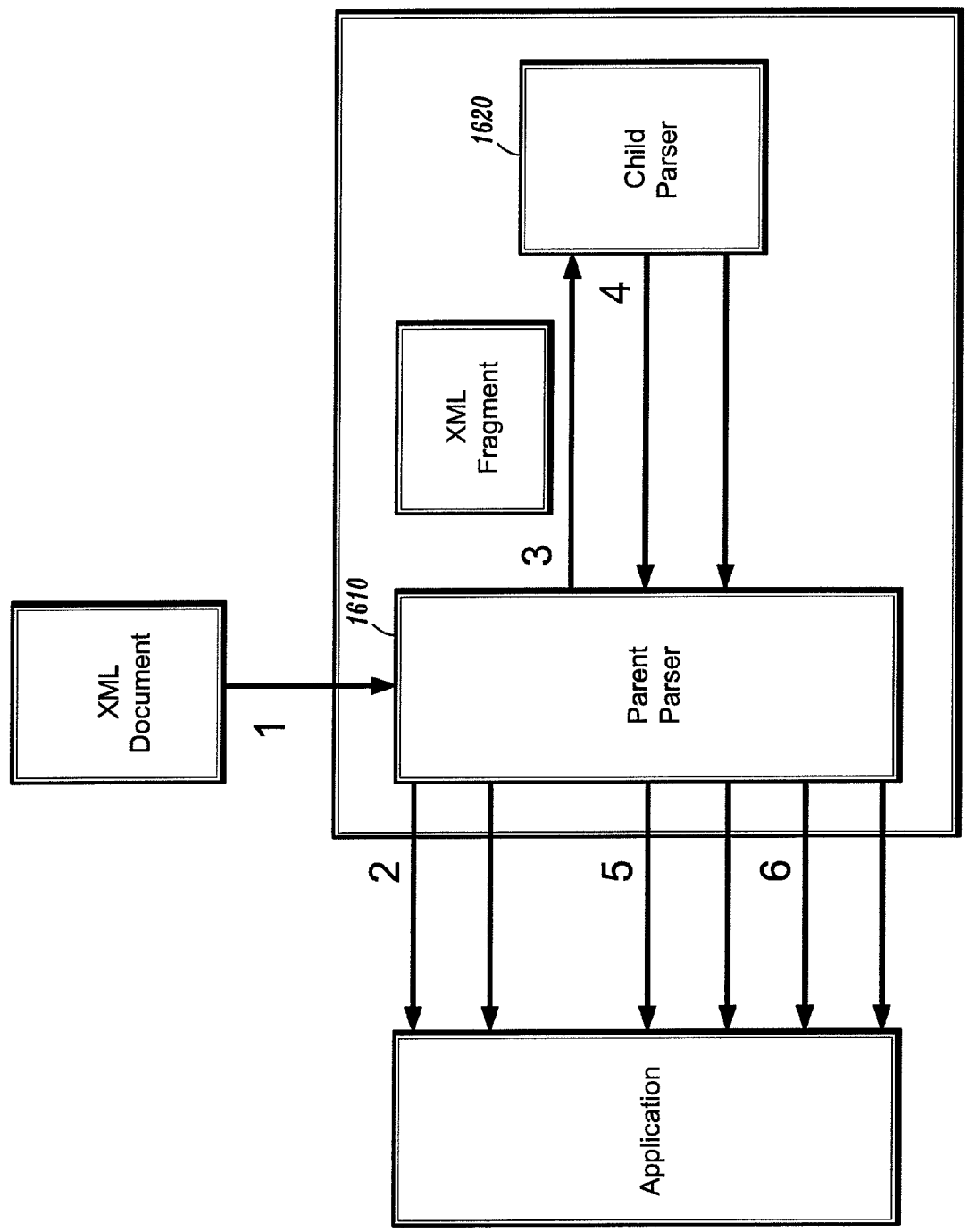
FIG. 16 is a diagram showing an implementation of exchanging of an XML fragment by Co-routine according to the embodiment.

FIG. 16 is a diagram showing an implementation of exchanging of an XML fragment by Co-routine.

In the implementation shown in FIG. 16, parent parser 1610 by breaking control unit 221 and child parser 1620 created by decode unit 223 are provided. At first, parent parser 1610 reads in an XML document (1), parses the XML document, and sends the parsed result to an application that uses the result (2). Next, a part of an XML document (an XML fragment) is written into a pipe (3). At this moment, in the above-mentioned client 200, an XML fragment is decoded in decode unit 223 and then written into a pipe.

Child parser 1620 reads in the XML fragment written in the pipe, parses the XML fragment and then writes the parsed result into a pipe (4). Parent parser 1610 reads in the parsed result written in the pipe and sends it to an application (5). Then parent parser 1610 parses the rest of the XML document and sends the parsed result to the application (6).

Figure 17:
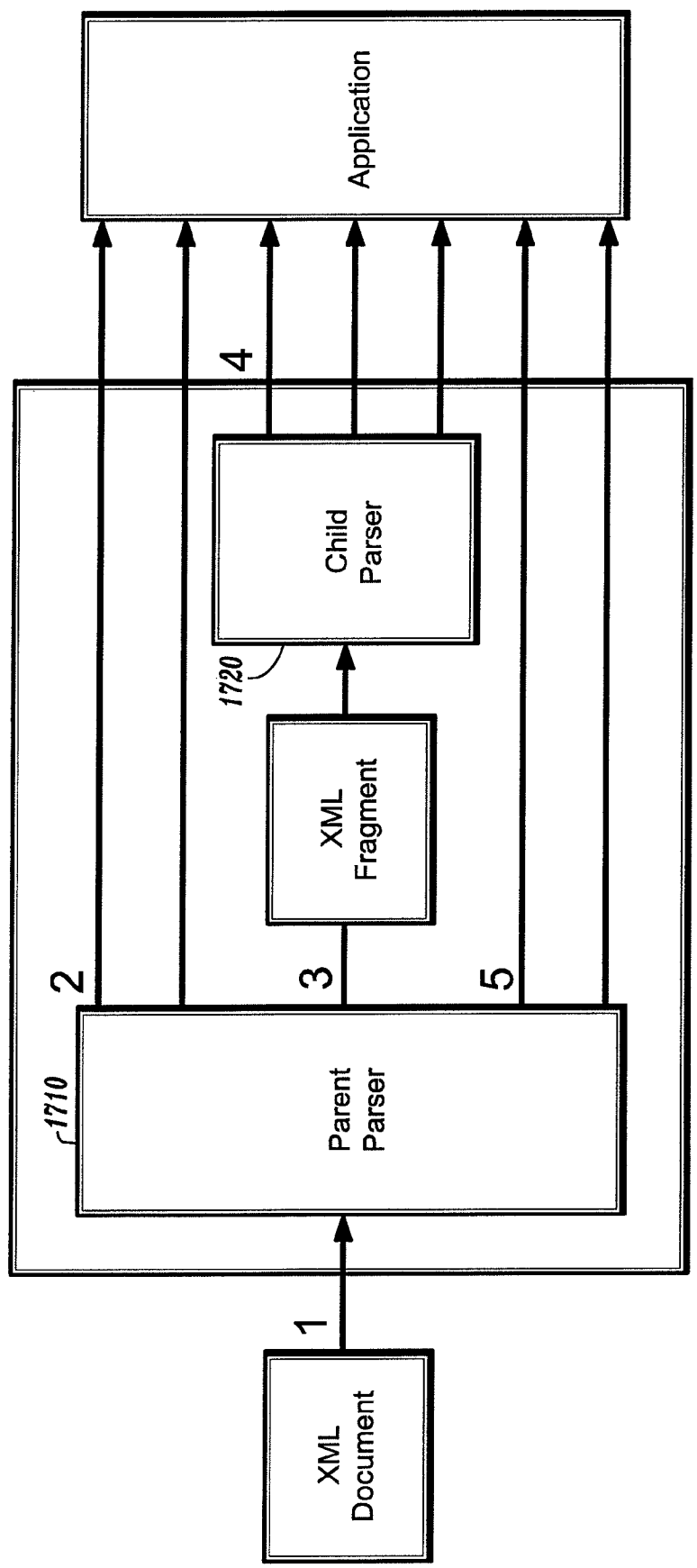
FIG. 17 is a diagram showing an implementation of exchanging of an XML fragment by PUSH API according to the embodiment.

FIG. 17 is a diagram showing an implementation of exchanging of an XML fragment by PUSH API such as SAX or XNI.

In the implementation shown in FIG. 17, parent parser 1710 by breaking control unit 221 and child parser 1720 created by decode unit 223 are provided. At first, parent parser 1710 reads in an XML document (1), parses the XML document and sends the parsed result to an application that uses the result (2). Parent parser 1710 also notifies child parser 1720 of a part of an XML document (an XML fragment) (3). At this moment, in the above-mentioned client 200, an XML fragment is decoded by decode unit 223 and then notified to child parser 1720.

Child parser 1720 parses an XML fragment received from parent parser 1710 and sends the parsed result to an application (4). Then, parent parser 1710 parses the rest of the XML document and sends the parsed result to the application (5).

Figure 18:
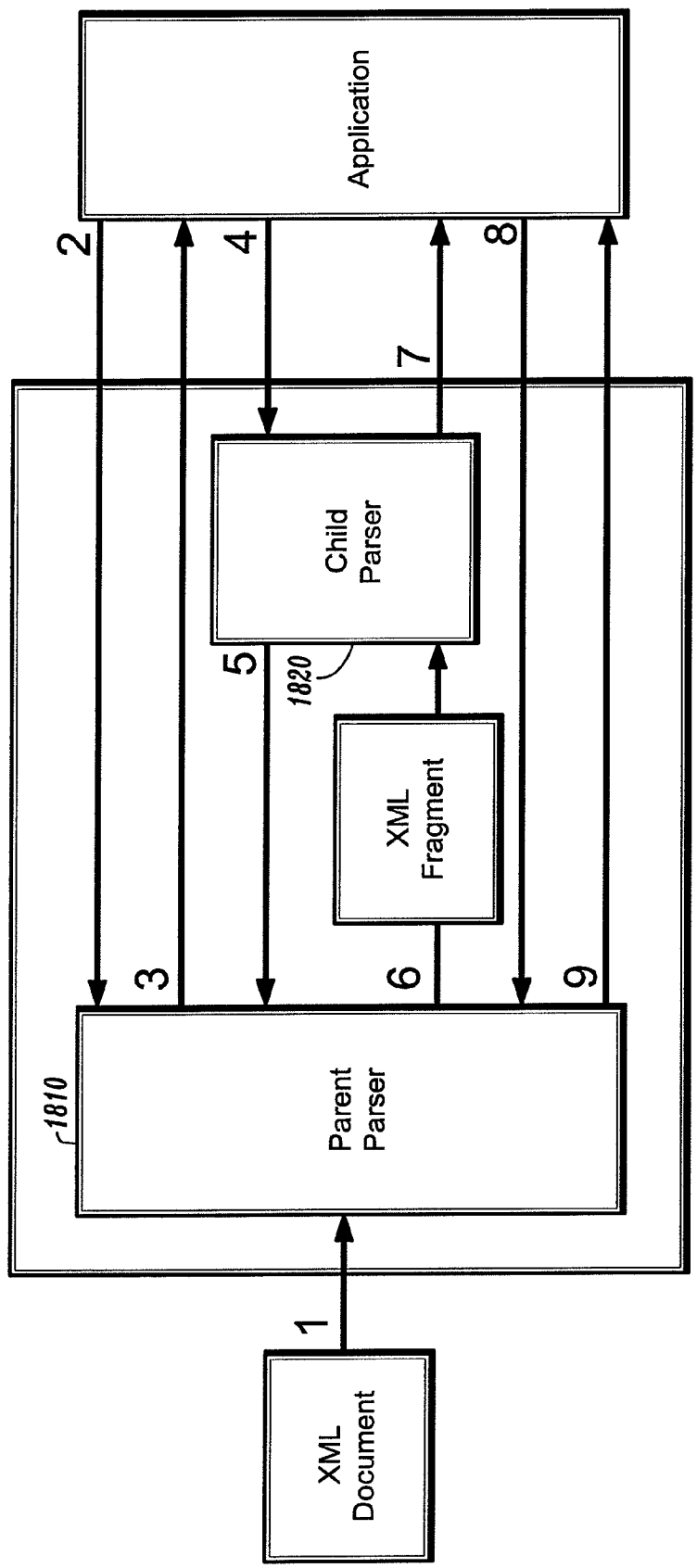
FIG. 18 is a diagram showing an implementation of exchanging of an XML fragment by PULL API according to the embodiment.

FIG. 18 is a diagram showing an implementation of exchanging of an XML fragment by a PULL API.

In the implementation shown in FIG. 18, parent parser 1810 by breaking control unit 221 and child parser 1820 created by decode unit 223 are provided. At first parent parser 1810 reads in an XML document (1). When an application that uses a parsed result of an XML document requires a parsed result from parent parser 1810 (2), parent parser 1810 parses the XML document and sends the parsed result to an application that uses the parsed result (3).

Next, when an application requires a parsed result from child parser 1820 (4), child parser 1820 requires a corresponding part of an XML document (an XML fragment) from parent parser 1810 (5). In response, parent parser 1810 notifies a corresponding XML fragment to child parser 1820 (6). At this moment, in the above-mentioned client 200, an XML fragment is decoded by decode unit 223 and then notified to child parser 1820.

Next, child parser 1820 parses an XML fragment received from parent parser 1810 and sends the parsed result to an application (7). Then, in response to a request from an application, parent parser 1810 parses the rest of the XML document (8) and sends the parsed result to an application (9).

Parent parser 1810 and child parser 1820 are collectively managed by a wrapper module. An access request is passed to an appropriate parser (parent parser 1810 or child parser 1820) by an application to directly request a parsed result from the wrapper module.

As mentioned above, in processing of a SOAP message according to the embodiment, processing (encryption, signing, decode, verification) of a message can be performed in a streaming process and DOM or other intermediate representation of an XML document needs not to be held in memory, while performing the process; thereby memory usage can be reduced and also the load of CPU can be reduced.

The above-mentioned method of parsing an XML document by dynamically creating a child parser and recursively performing a parsing process can be applied to, for example, decompression of a partly compressed XML document or decode of an encoded XML document in addition to the above-mentioned decode of an encrypted XML documents.

The embodiment has been described as an example of processing (encryption, signing, decode, verification) in composing or breaking of a SOAP message in Web Services Security, a processing method of a data file in a streaming process according to the embodiment may be widely applied to the case where processing such as encryption or signing, or the above-mentioned compression or encoding is performed on an XML document other than a SOAP message or a data file further with description specifications of generally including a header part and a body part, with a processing object of a predetermined process being set in the body part, and with information on the process and information specifying the processing object being described in the header part.

As mentioned above, the present invention provides a technique for sending/receiving a SOAP message with a little burden on a processing capability or memory of a client and implements a Web service system appropriate for using a terminal device with such a limited capability as a client.

The present invention also provides a method for processing a body part, which is performed according to a definition described in a header part, in a streaming process for a document file including a header part and a body part.

What is claimed is:

1. A method for processing a SOAP (Simple Object Access Protocol) message, comprising:
    a first step of extracting information on a process of a body part from a header part of the SOAP message and storing the extracted information into a work area of predetermined storing means, while parsing the SOAP message by a current parser;
    a second step of sequentially processing a predetermined part of said body part according to the extracted information stored in the work area of said predetermined storing means, while parsing said SOAP message by the current parser; and
    parsing said predetermined part processed by said second step in said body part by using an independent parser, and recursively performing said first and second steps,
    wherein the second step comprises:
        creating said independent parser in starting the process of said predetermined part of said body part;
        processing said predetermined part; and
        parsing said processed predetermined part by using said independent parser.

2. The method of claim 1, further comprising:
    extracting decode information including an encrypted part of said body part and a way of decode in said first step; and
    decoding a part of said body part specified by extracted said decode information according to the decode information in said second step.

3. The method of claim 1, further comprising:
extracting verification information including a signed part of said body part and a way of signing in said first step; and
verifying said signature for a part of said body part specified by extracted said verification information in said second step.

4. A method for processing a data file conforming to a specification of description for including a header part and a body part with a processing object of a predetermined process being set in the body part and information on the predetermined process and information specifying the processing object being described in the header part, the method comprising:
a first step of extracting the information on the predetermined process of the body part from the header part of the data file and storing the extracted information into a work area of predetermined storing means, while parsing said data file by a first parser; and
a second step of processing the processing object of said body part in a streaming process according to the extracted information stored in the work area of said storing means, while parsing said data file by said first parser,
wherein said second step comprises the steps of: creating a second parser independent of said first parser in starting the predetermined process of said processing object of said body part; processing said processing object; and parsing said processing object by using said second parser.

5. An information processing apparatus, comprising:
a processor;
a breaking-control unit, provided in the processor, for detecting a header part and a body part by parsing a SOAP (Simple Object Access Protocol) message and further detecting a processing object in the body part;
a header-processing unit for extracting information on a process of said body part from said header part detected by said breaking-control unit; and
a processing unit for performing the process on said processing object in said body part according to the information extracted by said header-processing unit, wherein said breaking-control unit parses said SOAP message by a current parser from the top in order, passes detected said header part to said header-processing unit, and also passes said processing object in detected said body part to said processing unit, and wherein said header-processing unit and said processing unit sequentially process a part of said SOAP message received from said breaking-control unit,
wherein said processing unit creates a parser independent of the current parser of said breaking-control unit in starting the process on said processing object of said body part and further parses the processing object by using the independent parser while parsing said SOAP message by the current parser.

6. The information processing apparatus of claim 5, wherein said header-processing unit extracts decode information including an encrypted part of said body part and a way of decode, and wherein said processing unit performs a decode process on a part of said body part specified in said decode information extracted by said header-processing unit according to the decode information.

7. The information processing apparatus of claim 5, wherein said header-processing unit extracts verification information including a signed part of said body part, a way of signing and a signature value, and at the sane time, verifies a signature by using the signature value, and wherein said processing unit verifies a signature by using a digest value calculated on the basis of said verification information for a part of said body part specified in extracted said verification information.

8. A program embedded in a computer memory for processing data by controlling a computer, wherein said program causes said computer to execute:
a first process of, while parsing a data file conforming to a specification of description for including a header part and a body part with a processing object of a predetermined process being set in the body part and information on the predetermined process and information specifying the processing object being described in the header part by a first parser, extracting the information on the predetermined process of the body part from the header part of the data file and storing the extracted information into a work area of predetermined storing means;
a second process of creating a second parser independent of said first parser in starting the predetermined process on said processing object while parsing the data file by the first parser;
a third process of, while parsing said data file by said first parser, processing the processing object of said body part in a streaming process according to the extracted information stored in the work area of said storing means; and
a fourth process of parsing said processing object by using said second parser.

\* \* \* \* \*